United States Patent [19]
Kamlukin

[11] 3,731,472
[45] May 8, 1973

[54] ROTARY MOWER SPINDLE BRAKE

[75] Inventor: Igor Kamlukin, Mequon, Wis.

[73] Assignee: Simplicity Manufacturing Company, Inc., Port Washington, Wis.

[22] Filed: Mar. 27, 1972

[21] Appl. No.: 238,387

[52] U.S. Cl. ...................56/11.3, 56/17.5, 192/16, 192/18 R
[51] Int. Cl. ...........................................A01d 35/26
[58] Field of Search................56/11.3, 11.7, 11.8, 56/17.5; 192/16, 18 R, 94

[56] References Cited

UNITED STATES PATENTS

| | | | |
|---|---|---|---|
| 2,325,917 | 8/1943 | Parker et al. | 192/16 |
| 2,985,992 | 5/1961 | Dowdle | 56/11.3 |

Primary Examiner—Louis G. Mancene
Assistant Examiner—J. A. Oliff
Attorney—Kenneth C. McKivett et al.

[57] ABSTRACT

A braking mechanism for use with rotary lawnmowers utilizing a vertically extending spindle having a lower end upon which is attached a mower blade and having an upper end mounting a driven sheave. Such sheave being provided with a surface spaced from a stationary surface and being provided with a friction lining separating the two surfaces. Such sheave being threadably engaged with a collar splined to said spindle so that upon termination of power to said spindle, said sheave rotates relative to said collar bringing such surfaces into frictional engagement with said friction lining for decelerating said spindle.

6 Claims, 5 Drawing Figures

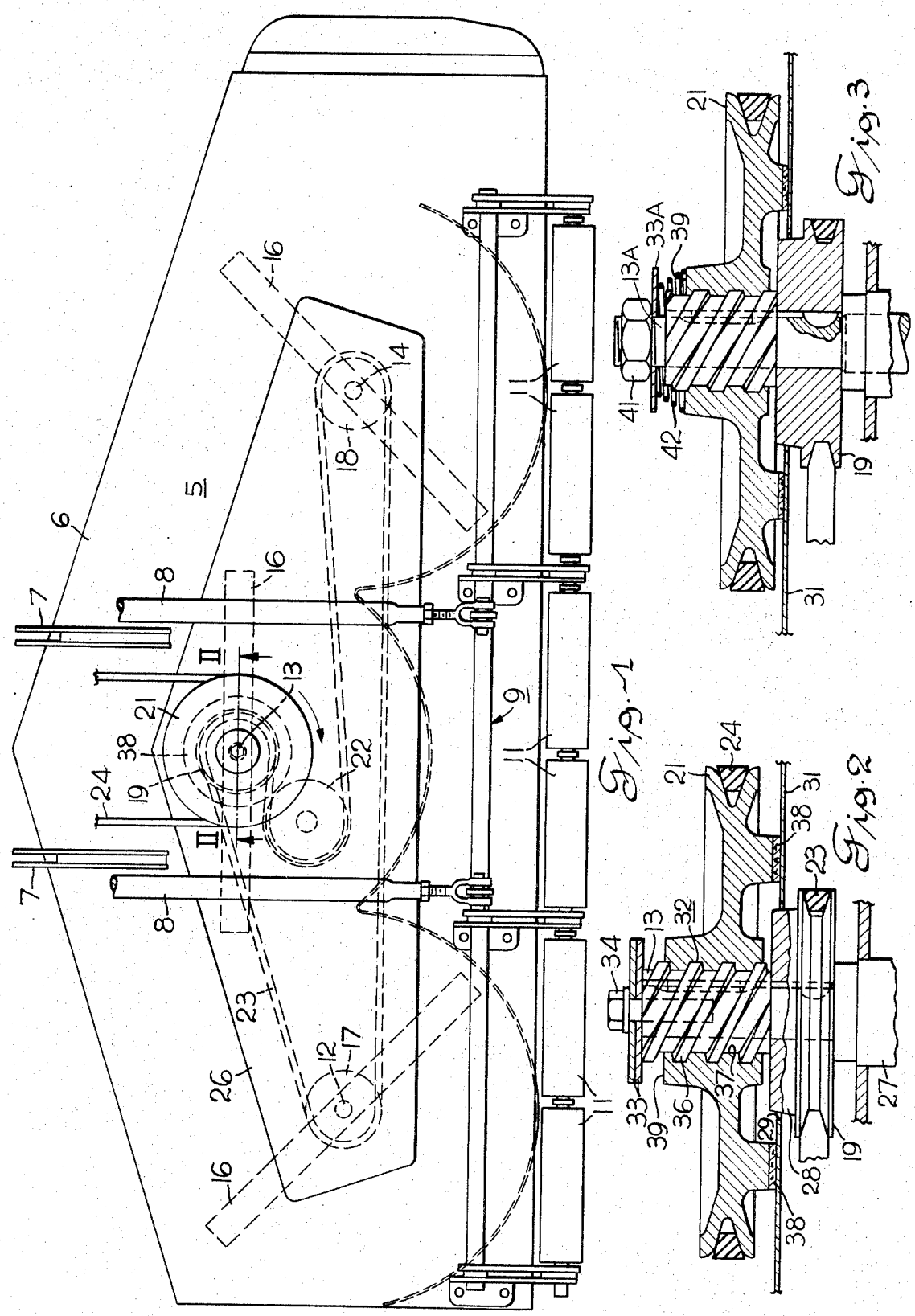

Patented May 8, 1973

ROTARY MOWER SPINDLE BRAKE

The invention relates to rotary lawnmowers, and in particular relates to braking of the cutting blades either in a mower where such blades have been declutched or in a mower where the engine has been shut off.

Many rotary lawnmowers of the walk behind type directly mount the blade structure upon the lower end of the engine crankshaft, larger mowers, particularly those of the riding type usually use a belt drive to connect the blade spindle to the engine driving the blade.

For safety reasons it is desirable to be able to declutch the mower blade from the engine, even though the engine may be driving the ground engaging wheels of the mower. The most commonly used clutching device is a belt tightener idler sheave for tightening or loosening the drive belt to the blade spindle.

When using a belt tightening clutching system, as soon as the belt tension is released, the blade will tend to coast due to inertial forces. Such coasting can continue for a considerable period of time, and the blade will be rotating very rapidly during the initial declutching period. Thus declutching does not render the mower safe even though power is cut off from the blade. Accordingly, it is an object of this invention to provide automatic braking means for a mower spindle which will quickly brake the spindle when power is cut off from the spindle and yet will not interfere with the normal operation of such mower so as to reduce its efficiency.

Another object of this invention is to provide braking means for a blade spindle which is simple, inexpensive and does not reduce the cutting efficiency of the mower.

The aforementioned objects of the invention will be apparent from the following description and accompanying drawings wherein:

FIG. 1 is a plan view of a tractor mounted mower embodying the invention with parts omitted for clarity of illustration;

FIG. 2 is an enlarged section view taken on line II—II of FIG. 1;

FIG. 3 is a view similar to FIG. 2 showing an alternative embodiment of the invention;

Figure 4:
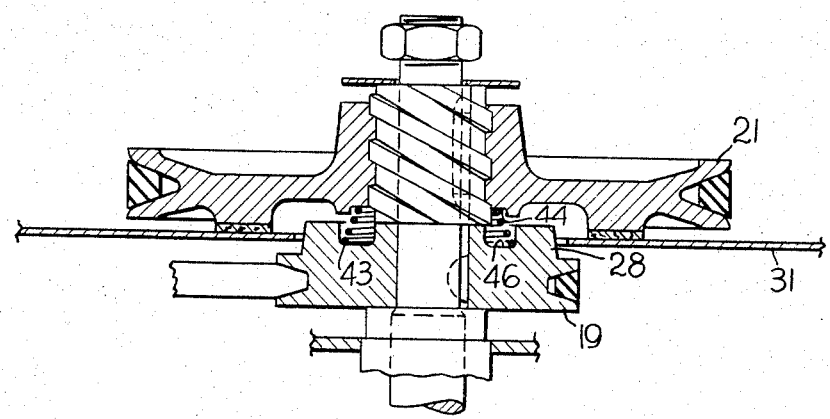
FIG. 4 is another alternative embodiment of the invention similar to FIGS. 2 and 3.

Referring to FIG. 1 of the drawings it is seen that only part of a tractor operated mower 5 is shown, the tractor is omitted for clarity of illustration. Mower 5 includes a housing 6 which is pivotally attached to the tractor (not shown) by means of forwardly extending support members 7. A mechanism is provided for raising and lowering mower 5 and includes a pair of adjustable rods 8 which are pivotally attached at their forward ends to the tractor (not shown). The rearward ends of rods 8 are attached to a height adjusting mechanism 9 for the mower which includes rollers 11 which ordinarily roll on the ground during operation and support the rearward end of the mower.

Mower 5 includes three rotating spindles 12, 13 and 14 which are journaled in housing 6. At the lower end of each spindle a blade 16 is attached for rotation therewith. At the upper end of spindle 12, a sheave 17 is splined thereto and a sheave 18 is splined to the upper end of spindle 14. A sheave 19 is splined to an upper mid-portion of spindle 13 and a driven sheave 21 is splined to the upper end of spindle 13. An adjustable idler sheave 22 is rotatably mounted on housing 6 in transverse alignment with sheaves 17, 18 and 19 and a V-belt 23 passes about sheaves 17 and 18 for driving same with belt 23 being tensioned by idler sheave 22. Sheave 19 is driven by spindle 13 which in turn is driven by sheave 21 which is driven by belt 24 driven by means on the tractor (not shown). A guard member 26 supported from housing 6, is positioned over the sheave members.

Referring to FIG. 2 it is seen that housing 6 supports a bearing structure 27 in which spindle 13 is journaled. Sheave 19 is keyed to spindle 13 as is shown in FIG. 2. It is seen that the hub portion 28 of sheave 19 extends through an opening 29 in a stationary member 31 carried by housing 6. A screw member 32 is keyed to spindle 13 and is restrained to limited longitudinal movement relative to spindle 13 by washers 33 which are held in position by bolt 34 which is threadably engaged with spindle 13. The periphery of screw member 32 is provided with thread 36 which engages with a complimentary thread 37 in sheave 21 to provide a screw spline between member 32 and sheave 21 which permits a limited screw movement between sheave 21 and member 32. The lower surface of sheave 21 is provided with a friction material covered surface 38 which is engageable with stationary member 31.

The operation of this spindle break is as follows:

The position of sheave 21 shown in FIG. 2 illustrates the sheave in a declutched position of the mower, that is, with friction material covered surface 38 contacting stationary member 31. Assume now that the tractor clutch is engaged resulting in belt 24 rotating sheave 21. This immediately causes sheave 21 to screw upwardly removing surface 38 from contact with stationary member 31. Such upward movement of sheave 21 continues until further movement is prevented by washers 33 being contacted by the upper surface 39. This upward screwing movement of sheave 21 results from the inertia present in the mowing members assembly which resist being put into rotation.

Assume now that the mower 5 is operating with sheaves 17, 18 and 19 all rotating and thereby also rotating blades 16 and the tractor is declutched so that belt 24 is no longer driving sheave 21. The inertia in the mowing blade assembly will tend to keep the blades 16 rotating while sheave 21 is slowing down at a more rapid rate. This difference in speed of rotation between sheave 21 and spindle 13 results in sheave 21 being screwed down on stationary member 31 to effectively and rapidly bring the cutting assembly to a halt.

FIG. 3 shows an alternative embodiment of the invention which includes having the upper end of the spindle 13A threaded to receive a nut 41 for retaining washer 33A in position compressing spring 42 against surface 39 of sheave 21. Spring 42 becomes more compressed when sheave 21 is screwed up to driving position and this energy stored in spring 42 will help to speed up the downward movement of sheave 21 upon declutching.

FIG. 4 is similar to FIG. 3 but shows a spring 43 positioned between the lower surface 44 of sheave 21 and the upper surface 46 of hub 28 of sheave 19. The functioning of spring 43 speeds up the upward movement of sheave 21 and tend to keep sheave 21 from being jammed in the declutch position shown.

Figure 5:
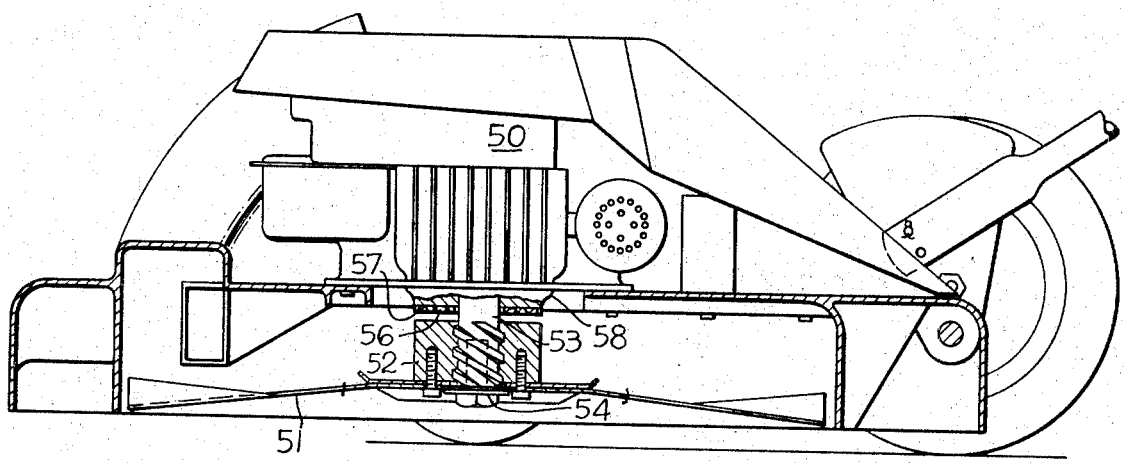
FIG. 5 is another embodiment of the invention applied to a walk behind mower.

FIG. 5 shows the invention applied to a walk-behind mower having an engine 50 and but a single blade 51 having a hub 52 attached thereto with such hub being threadably engaged with the lower end of engine shaft 53. Hub 52 is prevented from coming off of shaft 53 by a stop member 54 attached to the distal end of shaft 53. A brake pad material 56 is attached to the lower surface 57 of engine 50. The operation of this embodiment is as follows:

With engine 50 driving, blade hub 52 and blade 51 screw down against stop member 54 at the lower end of drive shaft 53 so that blades 51 revolve directly with shaft 51. When engine 50 is shut off the inertia of blade 51 and hub 52 causes the hub 52 and blade 51 to screw up on shaft 53 to engage brake pad 56 on the lower surface 57 of engine housing 58 and thus decelerate engine shaft 53 and the parts connected thereto including hub 52 and blade 51.

The embodiments of the invention in which an exclusive property or privelege is claimed are defined as follows:

1. In a rotary lawnmower including an engine, a housing for said engine, a drive shaft having a portion depending from said engine and said housing, said drive shaft depending portion including screw means thereon, a cutting blade, a hub attached to said blade and being provided with an internal passage screw threaded complimentary to said screw means, means for retaining said hub on said shaft with said internal passage threadably engaged with said screw means; and said hub having its upper surface provided with a friction material forming a brake with said housing when said engine is shut off and said hub moves upwardly along said screw means and into contact with said housing.

2. In a rotary mower as recited in claim 1 and wherein spring means are interposed between said hub and said retaining means for biasing said hub to move to braking position when said engine is shut off.

3. In a rotary mower belt driven from a tractor engine, a housing for said mower, a plurality of spindles rotatably mounted in said housing, cutting blades attached to the lower ends of said spindles for rotation therewith, sheaves attached to upper portions of said spindles, a V-belt operatively positioned about said sheaves for driving same, one of said spindles having a second sheave mounted on the upper end thereof for driving said spindle and said sheaves, said second sheave being drivenly connected to said tractor engine, said second sheave having a screw connection to said one of said spindles, a stationary member carried by said housing adjacent to said second sheave, said second sheave having a lower surface frictionally engaging said stationary member as a result of said tractor engine being declutched from said second sheave and said second sheave being screwed down into breaking relation with said stationary member as a result of the inertia of rotation of said blades.

4. In a rotary mower as recited in claim 3 and wherein said screw connection comprising a collar member attached to the upper portion of said one spindle and having a screw configured periphery, said second sheave having a threaded passage therethrough with said screw configured periphery engaged with said threaded passage so that a difference in revolution per minute of said sheave relative to said spindle results in a movement of said sheave towards or away from said stationary member.

5. In a rotary mower as recited in claim 3 and wherein spring means are interposed between said second sheave and said drive sheave for preventing said drive sheave from becoming jammed against said stationary surface.

6. In a rotary lawnmower including an engine, a housing for said engine, a drive shaft depending from said engine and said housing, a cutting blade, a hub attached to said blade and being threadably engaged with said drive shaft, means for retaining said hub on said shaft, and said hub having its upper surface provided with a friction material forming a brake with said housing when said engine is shut off and said hub moves upwardly on said drive shaft and into contact with said housing.

* * * * *

Notice of Adverse Decision in Interference

In Interference No. 98,644 involving Patent No. 3,731,472, I. Kamlukin, ROTARY MOWER SPINDLE BRAKE, final judgment adverse to the patentee was rendered Oct. 22, 1974, as to claim 3.

[*Official Gazette February 18, 1975.*]